US012733581B2

(12) United States Patent
Conrad et al.

(10) Patent No.: US 12,733,581 B2
(45) Date of Patent: Sep. 15, 2026

(54) HARVESTER IMPLEMENT WITH DYNAMICALLY ADJUSTABLE FLOAT SYSTEM

(71) Applicant: DEERE & COMPANY, Moline, IL (US)

(72) Inventors: Ethan C. Conrad, Ottumwa, IA (US); Thomas A. Nichols, Eldon, IA (US)

(73) Assignee: DEERE & COMPANY, Moline, IL (US)

( * ) Notice: Subject to any disclaimer, the term of this patent is extended or adjusted under 35 U.S.C. 154(b) by 512 days.

(21) Appl. No.: 18/473,818

(22) Filed: Sep. 25, 2023

(65) Prior Publication Data

US 2025/0098567 A1 Mar. 27, 2025

(51) Int. Cl.

| | |
|---|---|
| ***A01D 41/14*** | (2006.01) |
| ***A01D 34/00*** | (2006.01) |
| ***F15B 1/08*** | (2006.01) |
| *A01D 67/00* | (2006.01) |

(52) U.S. Cl.

CPC ......... *A01D 41/141* (2013.01); *A01D 34/006* (2013.01); *A01D 41/145* (2013.01); *F15B 1/08* (2013.01); *A01D 67/00* (2013.01); *F15B 2211/7741* (2013.01)

(58) Field of Classification Search

CPC . F15B 1/02; F15B 1/08; A01D 41/141; A01D 41/145

See application file for complete search history.

(56) References Cited

U.S. PATENT DOCUMENTS

| | | | | |
|---|---|---|---|---|
| 6,901,729 B1 * | 6/2005 | Otto | A01D 41/145 | 56/208 |
| 7,520,115 B2 * | 4/2009 | Coers | A01D 41/141 | 56/15.8 |
| 7,661,251 B1 * | 2/2010 | Sloan | A01D 41/145 | 60/413 |
| 7,707,811 B1 | 5/2010 | Strosser | | |
| 7,971,420 B1 * | 7/2011 | Bollin | A01D 41/145 | 56/208 |

(Continued)

FOREIGN PATENT DOCUMENTS

EP 3987909 A1 4/2022

OTHER PUBLICATIONS

Extended European Search Report and Written Opinion issued in European Patent Application No. 24196572.2 dated Feb. 13, 2025, in 10 pages.

*Primary Examiner* — Thomas E Lazo

(57) ABSTRACT

A harvester implement includes a linkage system supporting a harvester head, and a float system having an internal fluid pressure that is controllable to achieve a ground contact force between the harvester head and the ground surface. A controller is operable to receive a user defined input commanding a desired ground contact force, and define an initial value of the internal fluid pressure to achieve the desired ground contact force. The controller may then automatically detect a change in an operating parameter of the harvester head during operation, and automatically re-define the initial value of the internal fluid pressure to provide an adjusted value of the internal fluid pressure to maintain the desired ground contact force based on the detected change in the operating parameter of the harvester head during operation.

15 Claims, 5 Drawing Sheets

(56) References Cited

U.S. PATENT DOCUMENTS

| | | | | |
|---|---|---|---|---|
| 8,001,751 | B2 * | 8/2011 | Ehrhart | A01B 63/1013 56/11.9 |
| 8,230,771 | B2 * | 7/2012 | Bitter | A01D 41/145 91/361 |
| 9,198,349 | B2 * | 12/2015 | Ritter | A01D 41/141 |
| 9,717,180 | B2 * | 8/2017 | Teach | F15B 21/005 |
| 10,617,059 | B2 * | 4/2020 | Dunn | F15B 1/021 |
| 2006/0144028 | A1 | 7/2006 | McLean et al. | |
| 2011/0283673 | A1 * | 11/2011 | Moersch | A01D 41/141 56/14.9 |
| 2018/0153102 | A1 * | 6/2018 | Dunn | F15B 1/033 |
| 2019/0200523 | A1 * | 7/2019 | Fay, II | A01D 41/145 |
| 2021/0100155 | A1 * | 4/2021 | Vandeven | A01D 47/00 |
| 2022/0053693 | A1 * | 2/2022 | Gahres | A01D 41/145 |
| 2022/0117143 | A1 * | 4/2022 | Kraus | A01D 41/141 |

* cited by examiner

HARVESTER IMPLEMENT WITH DYNAMICALLY ADJUSTABLE FLOAT SYSTEM

TECHNICAL FIELD

The disclosure generally relates to a harvester implement having a harvester head float system.

BACKGROUND

Some harvester implements are configured to receive or connect to an attachable harvester head. The harvester head may include, but is not limited to, a cutter head for cutting standing crop material. A linkage system connects the harvester head to a main frame of the harvester implement. Harvester implement may include a float system, which enables the implement linkage system to be operated in a float operating condition. The float operating condition allows the cutter head to vertically track a ground surface during horizontal movement over the ground surface.

When operating in the float operating condition, the float system may be adjusted to control a ground contact force between the harvester head and the ground surface. If the float system is adjusted to heavy, i.e., the ground contact force is too high, then, the harvester head may fail to raise up when contacting raised elevation portions of the ground surface, causing the harvester head to scalp the ground surface. Scalping the ground surface may damage the field and increases wear on the components of the harvester head. If the float system is adjusted light, i.e., the ground contact force is too low, then the harvester head may bounce and/or fail to quickly return to the ground surface after contacting a raised elevation portion of the ground surface, thereby reducing crop harvest.

SUMMARY

A harvester implement is provided. The harvester implement may include a main frame supporting at least one ground engaging device and operable to traverse across a ground surface. A linkage system is attached to the main frame. The linkage system is moveable relative to the main frame. A harvester head is attached to and supported by the linkage system relative to the main frame. A float system interconnects the main frame and the linkage system. The float system includes an internal fluid pressure that is controllable to achieve a ground contact force between the harvester head and the ground surface. The harvester implement further includes a controller. The controller includes a processor and a memory having a float control algorithm stored thereon. The processor is operable to execute the float control algorithm to receive a user defined input commanding a desired ground contact force, and define an initial value of the internal fluid pressure to achieve the desired ground contact force. The controller may then automatically detect a change in an operating parameter of the harvester head during operation, and automatically re-define the initial value of the internal fluid pressure to provide an adjusted value of the internal fluid pressure to maintain the desired ground contact force based on the detected change in the operating parameter of the harvester head during operation.

In one aspect of the disclosure, the change in the operating parameter of the harvester head may include and/or be defined as a deviation between a first data set and a second data set over a period of time that is greater than or less than a defined allowable threshold variation from an initial value of the operating parameter. In other words, a change from the initial value of the operating parameter by more or less than the defined allowable threshold variation may indicate a change in the operating parameter of the harvester head.

In one aspect of the disclosure, the float system may include a hydraulic float cylinder that is operably controlled via the internal fluid pressure exerted by a hydraulic fluid. The float system may include an accumulator disposed in fluid communication with the hydraulic float cylinder. As is understood in the art, a hydraulic float cylinder extends and retracts in response to the internal fluid pressure of the float system. The accumulator is a pressure storage reservoir that enables the float system to smooth out pulsations therein caused by movement of the linkages system, such as when the harvester head contacts the ground surface and is forced upward.

In one aspect of the disclosure, the harvester implement may include a tilt system that interconnects the linkage system and the harvester head. The tilt system includes a tilt cylinder that is operable to control a tilt angle or tilt position between the harvester head and the linkage system.

In one aspect of the disclosure, the harvester head may include a gauge shoe positioned to contact the ground surface. The gauge shoe is repositionable and operable to control a minimum height between the harvester head and the ground surface.

In one aspect of the disclosure, the operating parameter of the harvester head may include, but is not limited to, one of a tilt position of the harvester head relative to the linkage system, a position of a gauge shoe of the harvester head relative to the linkage system, or a temperature of a hydraulic fluid generating the internal fluid pressure of the float system.

In one aspect of the disclosure, the processor is operable to execute the float control algorithm to automatically detect a change during operation in one of the tilt position of the harvester head relative to the linkage system, the position of the gauge shoe of the harvester head relative to the linkage system, or the temperature of the hydraulic fluid generating the internal fluid pressure of the float system.

In one aspect of the disclosure, the harvester implement may include a tilt position sensor that is operable to detect data related to a tilt angle and/or a tilt position between the harvester head and the linkage system. The tilt position sensor may include, but is not limited to, a linear potentiometer, a rotary potentiometer, an optical sensor, and angular sensor, or some other device capable of detecting data related to the relative position between the linkage system and the harvester head.

In one aspect of the disclosure, the harvester implement may include a shoe position sensor that is operable to detect data related to a position of a gauge shoe of the harvester head relative to the linkage system. The shoe position sensor may include, but is not limited to, a linear potentiometer, a rotary potentiometer, an optical sensor, and angular sensor, or some other device capable of detecting data related to the position of the gauge shoe relative to the harvester head and/or the linkage system.

In one aspect of the disclosure, the harvester implement may include a temperature sensor that is operable to detect a temperature of a hydraulic fluid of the float system. The temperature sensor may include, but is not limited to, a thermocouple, a resistive temperature device, a thermistor, an infrared sensor, a bimetallic temperature sensor, or some other device capable of sensing data related to the temperature of the hydraulic fluid of the float system.

In one aspect of the disclosure, the harvester implement may further include a contact force sensor. The contact force sensor is operable to detect data related to a current contact force between the harvester head and the ground surface. In one implementation, the contact force sensor may be coupled to a gauge shoe of the harvester head. The contact force sensor may include, but is not limited to, an elastic pressure sensor, an electrical transducer, a differential pressure cell, a vacuum pressure sensor, a strain gauge, or some other device capable of detecting data related to the pressure and/or force exerted between the gauge shoe of the harvester head and the ground surface.

In one aspect of the disclosure, the contact force sensor may be operable to communicate a communication signal to a communicator. In one implementation, the communication signal may be communicated via the controller based on data the controller receives from the contact force sensor. The communication signal is operable to generate an indication of the current contact force between the harvester head and the ground surface on the communicator. By so doing, an operator may monitor the actual and/or current ground pressure between the harvester head and the ground surface, and adjust the desired ground contact force accordingly.

In one aspect of the disclosure, the harvester implement includes a self-propelled windrower implement, and the harvester head includes a cutter head, such as but not limited to a rotary cutter head or a draper cutter head.

Accordingly, the controller may automatically monitor the operation of the harvester implement and harvester head to determine a change in an operating parameter of the harvester head. Upon detecting a change in the operating parameter of the harvester head, the controller may automatically adjust the internal fluid pressure of the float system to maintain the desired ground contact force between the harvester head and the ground surface. By so doing, the desired ground contact force may be maintained dynamically to account for changing operating parameters of the harvester head as the harvester implement moves across the ground surface.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
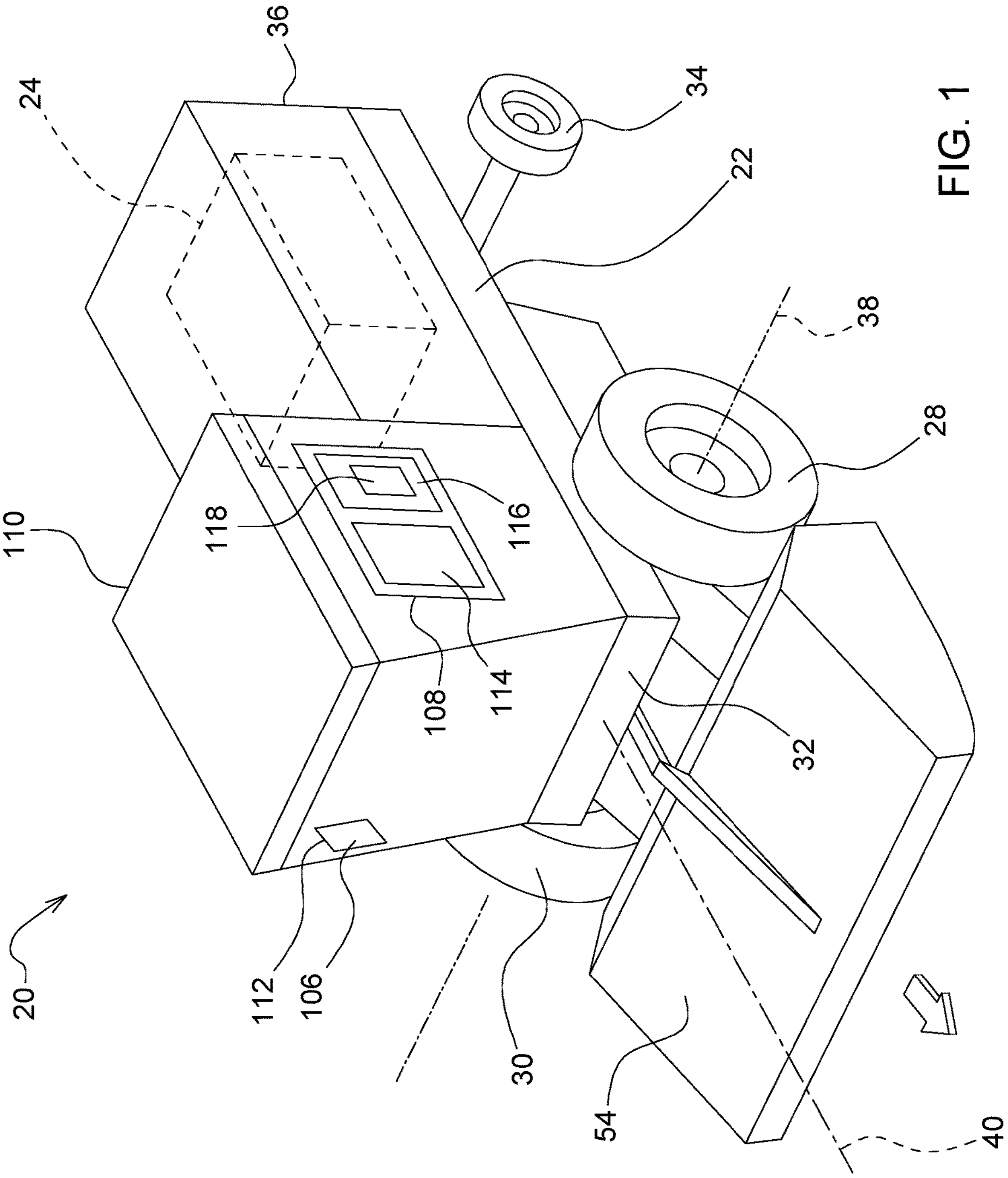
FIG. 1 is a schematic perspective view of a harvester implement.

Referring to the Figures, wherein like numerals indicate like parts throughout the several views, a harvester implement is generally shown at 20. Referring to FIG. 1, the example embodiment of the harvester implement 20 includes, but is not limited to, a self-propelled windrower implement. However, it should be appreciated that the teachings of this disclosure may be applied to machines other than the example windrower implement depicted in FIG. 1.

Referring to FIG. 1, the harvester implement 20 includes a main frame 22, which supports a prime mover 24. The prime mover 24 may include, but is not limited to, an internal combustion engine, an electric motor, a combination of both, or some other device capable of generating torque to power the harvester implement 20.

Figure 4:
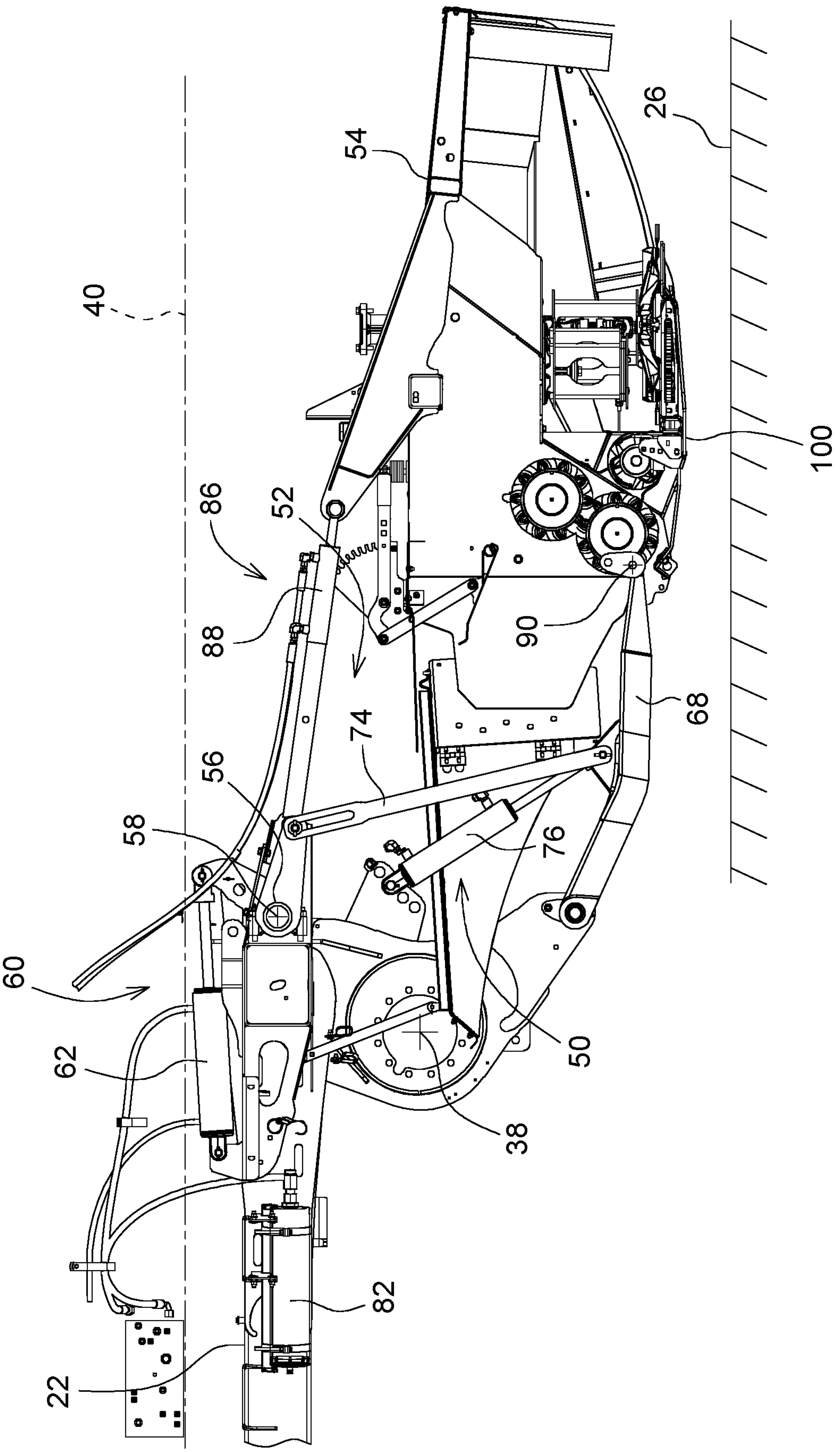
FIG. 4 is a schematic side view of the main frame and the hydraulic system.

The main frame 22 supports at least one ground engaging devices 28, 30, 34 and is operable to traverse across a ground surface 26 (shown in FIG. 4). In the example implementation shown in the Figures and described herein, the ground engaging devices 28, 30, 34 includes a left front drive wheel 28 and a right front drive wheel 30 each mounted to the main frame 22 adjacent a forward end 32 of the main frame 22, and a left rear caster wheel 34 and a right rear caster wheel (not shown) each attached to the main frame 22 adjacent a rearward end 36 of the main frame 22. The left front drive wheel 28 and the right front drive wheel 30 are rotatable about a transverse axis 38. The transverse axis 38 is generally perpendicular to a longitudinal axis 40 of the main frame 22.

As understood by those skilled in the art, the left front drive wheel 28 and the right front drive wheel 30 may be simultaneously rotated in the same rotational direction and at the same rotational speed about the transverse axis 38 to drive the harvester implement 20 forward or rearward, depending upon the direction of rotation. Additionally, the left front drive wheel 28 and the right front drive wheel 30 may be rotated in the same rotational direction at different rotational speeds about the transverse axis 38, or in opposite rotational directions at the same or different rotational speeds about the transverse axis 38, in order to turn the agricultural vehicle.

As used herein, the term "caster wheel" should be understood to include a wheel that is able to rotate a full three hundred sixty degrees (360°) about a respective generally vertical axis. As such, each of the left rear caster wheel 34 and the right rear caster wheel are rotatable a full three hundred sixty degrees (360°) about a respective generally vertical axis. The left rear caster wheel 34 and the right rear caster wheel may be attached to the main frame 22 in a suitable manner. The specific manner in which the left rear caster wheel 34 and the right rear caster wheel are attached to the main frame 22 is not pertinent to the teachings of this disclosure, are understood by those skilled in the art, and are therefore not described in detail herein.

Figure 2:
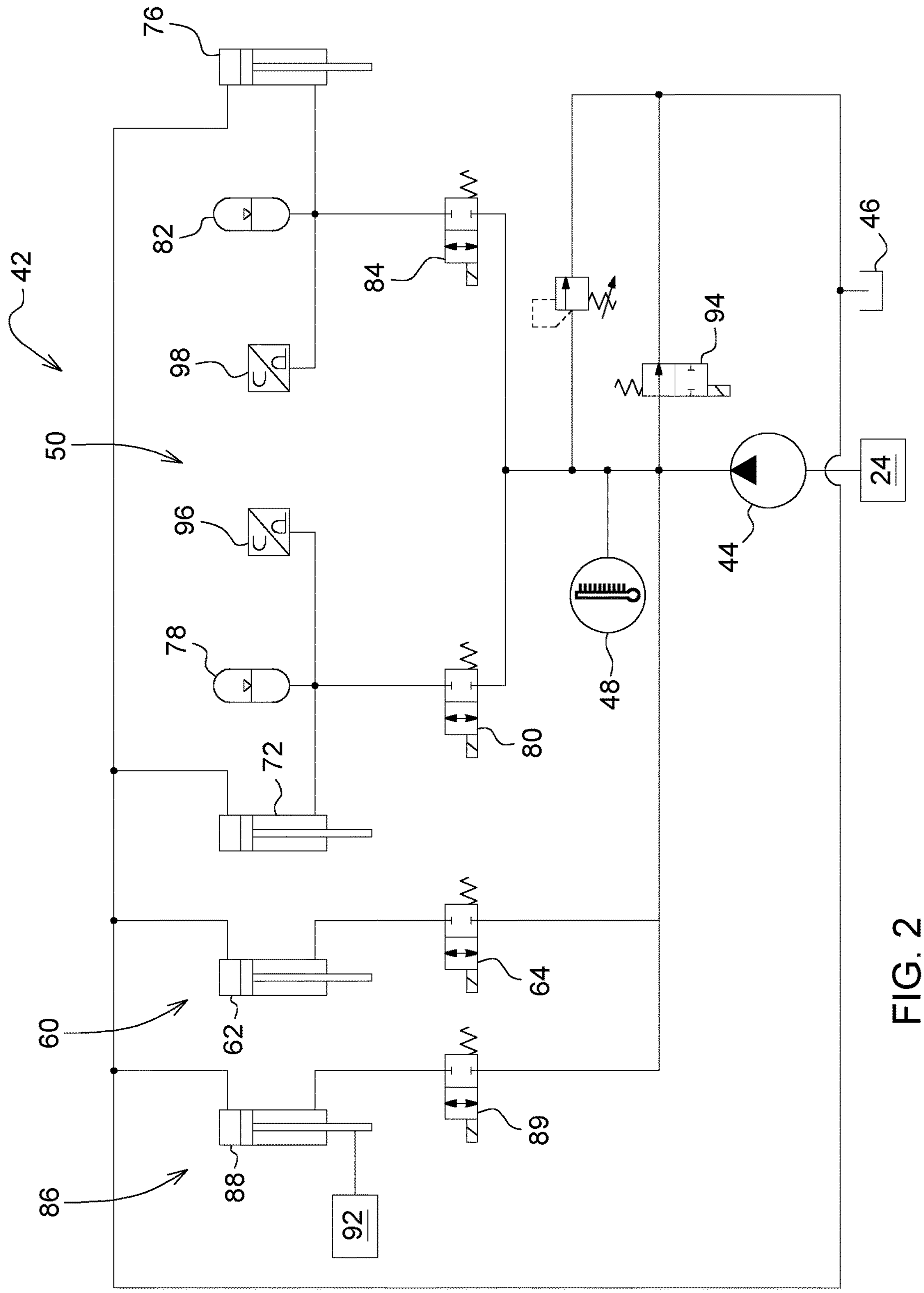
FIG. 2 is a schematic diagram of a hydraulic system of the harvester implement.
Figure 3:
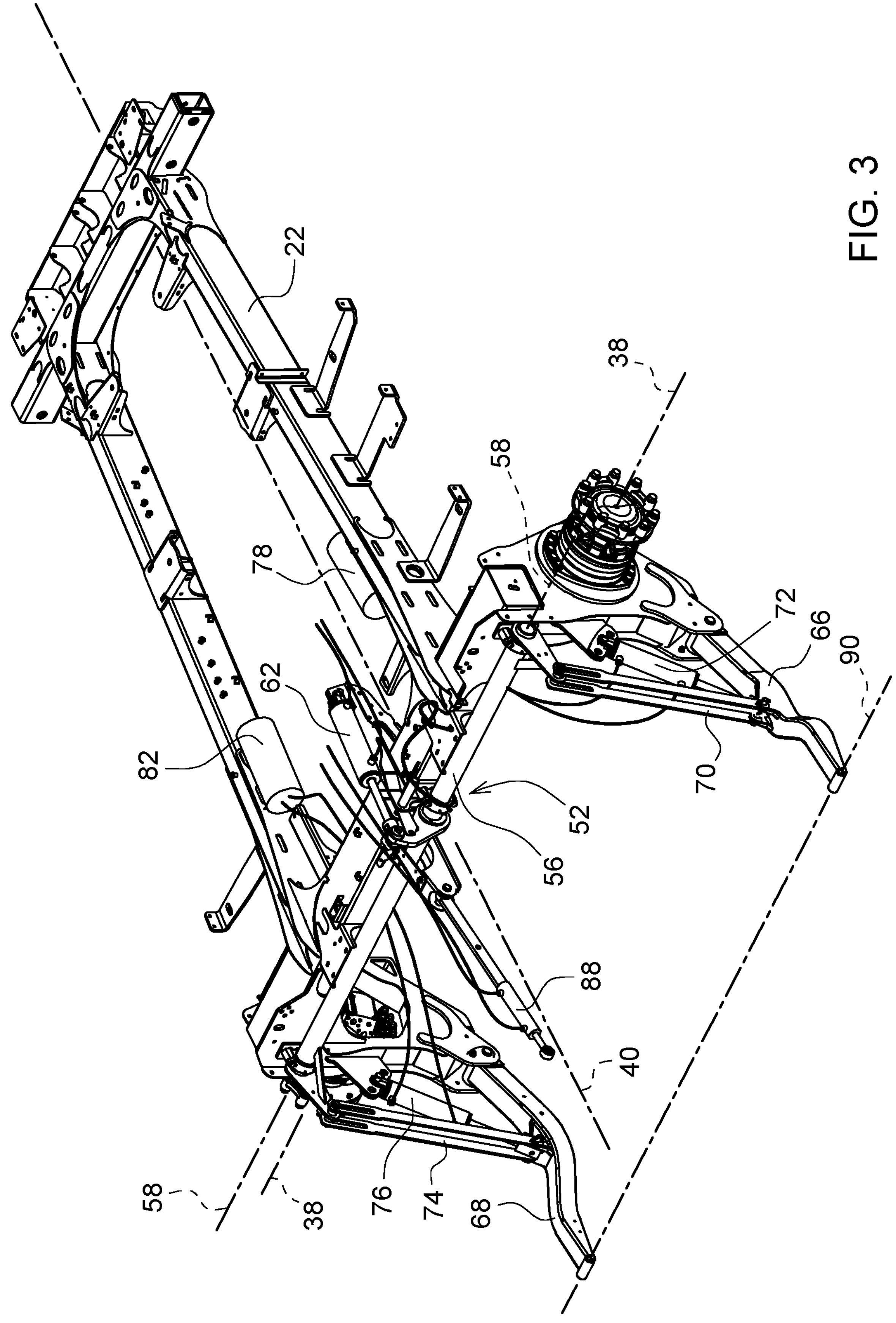
FIG. 3 is a schematic perspective view of a main frame of the harvester implement showing the hydraulic system.

Referring to FIGS. 2-4, the harvester implement 20 includes a hydraulic system 42. The hydraulic system 42 includes a pressure source 44 configured to supply a flow of pressurized hydraulic fluid. The pressure source 44 may include, but is not limited to, an auxiliary fluid pump that is driven by and coupled to the prime mover 24. The pressure source 44 draws the hydraulic fluid from a tank 46, and circulates the hydraulic fluid through the hydraulic system 42. The tank 46 receives the hydraulic fluid from the hydraulic system 42, stores the fluid, and supplies the hydraulic fluid to the pressure source 44, e.g., the auxiliary fluid pump. Fluid flow and/or pressure may be used to operate various components of the harvester implement 20, as described in greater detail below.

The hydraulic system 42 may include a temperature sensor 48 that is operable to detect a temperature of the hydraulic fluid of the hydraulic system 42, and particularly a temperature of the hydraulic fluid in a float system 50 described in greater detail below. The temperature sensor 48 may include, but is not limited to, a thermocouple, a resistive temperature device, a thermistor, an infrared sensor, a bimetallic temperature sensor 48, or some other device capable of sensing data related to the temperature of the hydraulic fluid of the hydraulic system 42.

Referring to FIG. 3, the harvester implement 20 includes an implement linkage system 52 attached to the main frame 22. The linkage system 52 is moveable relative to the main frame 22. In the implementation shown in the Figures and described herein, the implement linkage system 52 is attached to the main frame 22 adjacent the forward end 32 of the main frame 22. The implement linkage system 52 is configured for supporting and attaching a harvester head 54 relative to the main frame 22. In the example implementation shown in the Figures and described herein, the harvester head 54 may include a rotary cutter head, such as shown in FIG. 1, a draper cutter head, a corn harvester, or some other implement configured for harvesting a crop. It should be appreciated that the harvester head 54 may include a device other than the example rotary cutter head, and that the harvester implement 20 is not limited to the self-propelled windrower implement shown in the figures and desired herein.

Referring to FIG. 3, the implement linkage system 52 includes a rockshaft 56 rotatably mounted to the main frame 22 for rotational movement about a shaft axis 58 that extends transverse to the longitudinal axis 40 of the main frame 22. A lift system 60 includes a lift cylinder 62 attached to and interconnecting the rockshaft 56 and the main frame 22. The lift cylinder 62 is operable to rotate the rockshaft 56 about the shaft axis 58 in order to raise and lower the harvester head 54 relative to the ground surface 26. As such, the lift cylinder 62 is operated to control a vertical height of the harvester head 54 above the ground surface 26. In the example implementation described herein, the lift cylinder 62 is a single acting hydraulic cylinder disposed in fluid communication with the hydraulic system 42. As shown in FIG. 2, a lift control valve 64 controls fluid communication between the lift cylinder 62 and the pressure source 44. In other embodiments, the lift cylinder 62 may include a double acting hydraulic cylinder, an electrically actuated linear actuator, or some other device capable of extending and retracting. The lift cylinder 62 extends in response to fluid pressure and/or flow from the hydraulic system 42 in the usual manner, and is retracted by gravitational forces acting on the implement linkage system 52 and/or the selected harvester head 54 attached to the implement linkage system 52 as understood by those skilled in the art.

Referring to FIG. 3, the float system 50 interconnects the main frame 22 and the linkage system 52. The implement linkage system 52 may further include a left connecting arm 66 and a right connecting arm 68. The left connecting arm 66 is rotatably attached to the main frame 22 below the rockshaft 56, on a left side of the main frame 22. A left linkage 70 is attached to and interconnects the left connecting arm 66 and the rockshaft 56. The float system 50 may include a left float cylinder 72 attached to and interconnecting the main frame 22 and the left linkage 70. A respective forward end 32 of the left float cylinder 72 is attached to the left linkage 70. The left float cylinder 72 extends rearward and vertically upward to a respective rearward end 36 of the left float cylinder 72, which is attached to the main frame 22.

The right connecting arm 68 is rotatably attached to the main frame 22 below the rockshaft 56, on a right side of the main frame 22. A right linkage 74 is attached to and interconnects the right connecting arm 68 and the rockshaft 56. The float system 50 may include a right float cylinder 76 attached to and interconnecting the main frame 22 and the right linkage 74. A respective forward end 32 of the right float cylinder 76 is attached to the right linkage 74. The right float cylinder 76 extends rearward and vertically upward to a respective rearward end 36 of the right float cylinder 76, which is attached to the main frame 22.

Referring to FIG. 2, the float system 50 is disposed in fluid communication with the hydraulic system 42, and includes an internal fluid pressure that is controllable to achieve a ground contact force between the harvester head 54 and the ground surface 26. The left float cylinder 72 and the right float cylinder 76 are operably controlled via the internal fluid pressure exerted by the hydraulic fluid as is understood by those skilled in the art.

As shown in FIG. 2, the left float cylinder 72 is disposed in fluid communication with a left accumulator 78. The left float cylinder 72 and the left accumulator 78 cooperate to form a volume. The internal fluid pressure within the volume defined by the left float cylinder 72 and the left accumulator

78 may be controlled to provide a resistance against retraction or compression of the left float cylinder 72. A left float control valve 80 controls fluid communication between the left float cylinder 72 and the pressure source 44 of the hydraulic system 42.

As shown in FIG. 2, the right float cylinder 76 is disposed in fluid communication with a right accumulator 82. The right float cylinder 76 and the right accumulator 82 cooperate to form a volume. The internal fluid pressure within the volume defined by the right float cylinder 76 and the right accumulator 82 may be controlled to provide a resistance against retraction or compression of the right float cylinder 76. A right float control valve 84 controls fluid communication between the right float cylinder 76 and the pressure source 44 of the hydraulic system 42. The left float cylinder 72 and the right float cylinder 76 are each operable to provide a bias or resistance force against upward movement of the left connecting arm 66 and the right connecting arm 68 respectively.

In the example implementation described herein, the left float cylinder 72 and the right float cylinder 76 are each single acting hydraulic cylinders disposed in fluid communication with the hydraulic system 42. In other embodiments, the left float cylinder 72 and the right float cylinder 76 may include a double acting hydraulic cylinder, an air cushion or spring device, or some other device capable of biasing the left connecting arm 66 and the right connecting arm 68 downward toward the ground surface 26. It should be appreciated that in other implementations of the disclosure, the float system 50 may include only a single float cylinder disposed in fluid communication with a single accumulator.

Referring to FIGS. 3 and 4, the implement linkage system 52 may further include a tilt system 86. The tilt system 86 interconnects the linkage system 52 and the harvester head 54. The tilt system 86 may include a tilt cylinder 88 that is operable to control a relative tilt angle and/or a relative tilt position between the harvester head 54 and the linkage system 52. The tilt cylinder 88 is attached to and interconnects the main frame 22 and the harvester head 54 attached to the implement linkage system 52. The tilt cylinder 88 is operable to rotate the selected harvester head 54 attached to the implement linkage system 52 relative the ground surface 26. More specifically, the tilt cylinder 88 rotates the selected harvester head 54 about a tilt axis 90, which extends transverse to the longitudinal axis 40 of the main frame 22 and through distal ends of the left connecting arm 66 and the right connecting arm 68. In the example implementation described herein, the tilt cylinder 88 is a double acting hydraulic cylinder disposed in fluid communication with the hydraulic system 42. A tilt control valve 89 controls fluid communication between the tilt cylinder 88 and the pressure source 44 of the hydraulic system 42. In other embodiments, the tilt cylinder 88 may include a single acting hydraulic cylinder, an electrically actuated linear actuator, or some other device capable of extending and retracting. The tilt cylinder 88 extends and retracts in response to fluid pressure and/or flow from the hydraulic system 42 in the usual manner as understood by those skilled in the art.

The harvester implement 20 may further include a tilt position sensor 92. The tilt position sensor 92 is operable to detect data related to the relative tilt angle and/or relative tilt position between the harvester head 54 and the linkage system 52. The tilt position sensor 92 may include, but is not limited to, a linear potentiometer, a rotary potentiometer, an optical sensor, and angular sensor, or some other device capable of detecting data related to the relative position between the linkage system 52 and the harvester head 54.

The implement linkage system 52 is controllable between a float operating condition and a fixed height operating condition. When configured for the float operating condition, the implement linkage system 52 allows the harvester head 54 to vertically track the ground surface 26 during horizontal movement of the harvester implement 20 over the ground surface 26. Referring to FIG. 2, when configured for the float operating condition, the lift control valve 64 is closed to block fluid communication between the pressure source 44 and the lift cylinder 62. A return valve 94 may be opened to allow fluid communication between the lift cylinder 62 and the tank 46, which allows the lift cylinder 62 to extend and retract freely. Additionally, when the implement linkage system 52 is configured for the float operating condition, a desired amount of fluid pressure is supplied to the left float cylinder 72 and the right float cylinder 76 to provide a desired internal fluid pressure to the left float cylinder 72 and the right float cylinder 76 to resist against upward vertical movement, thereby keeping the selected harvester head 54 in contact with the ground surface 26 while allowing the selected harvester head 54 to track the ground surface 26. The value of the internal fluid pressure supplied to the left float cylinder 72 and the right float cylinder 76 is proportional to the ground contact force between the harvester head 54 and the ground surface 26. A higher internal fluid pressure generates a quicker return downward and a higher ground contact force, whereas a lower internal fluid pressure generates a slower return downward and a lower ground contact force. A left pressure sensor 96 may be included to sense and monitor the fluid pressure applied to the left float cylinder 72. Similarly, a right pressure sensor 98 may be included to sense and monitor the fluid pressure applied to the right float cylinder 76.

Figure 5:
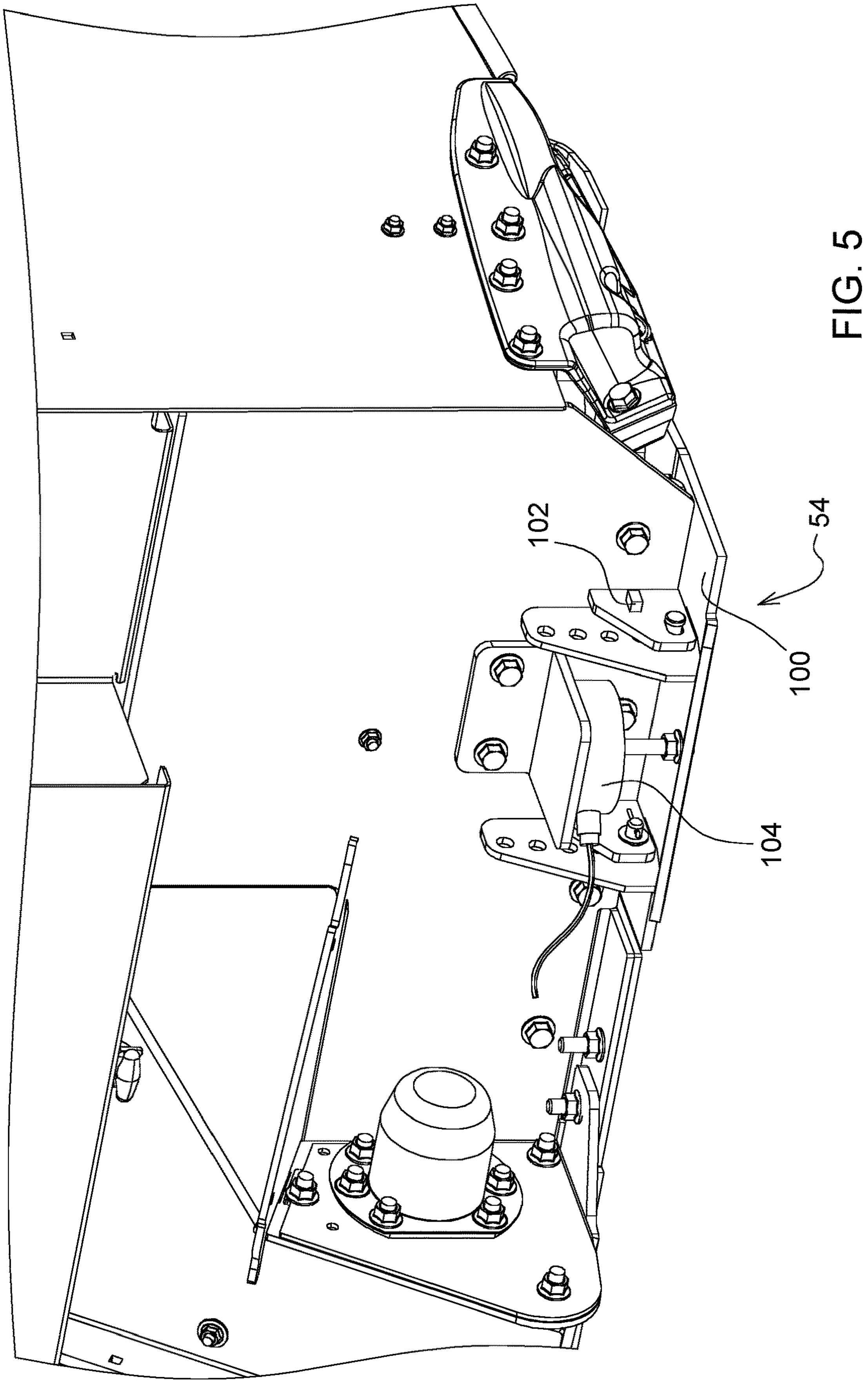
FIG. 5 is a schematic perspective view of a harvester head of the harvester implement showing a gauge shoe.

Referring to FIGS. 4 and 5, the harvester head 54 includes at least one gauge shoe 100. The gauge shoe 100 is positioned to contact the ground surface 26 and operable to control a minimum height between the harvester head 54 and the ground surface 26. The gauge shoe 100 may be adjustably attached to the harvester head 54 to set a desired head height above the ground surface 26. As such, the gauge shoe 100 may be moved between different vertical positions relative to the harvester head 54 to control the desired head height above the ground surface 26. The gauge shoe 100 is intended to be the portion of the harvester head 54 that contacts the ground surface 26 and prevent other components of the harvester head 54 from contacting the ground surface 26. The gauge shoe 100 may include a plate, skid, or other rigid structure that is attached to the harvester head 54 and capable of supporting the harvester head 54 and sliding across the ground surface 26. In the implementation described herein, the gauge shoe 100 may include, but is not limited to a left gauge shoe 100 disposed on the left side of the harvester head 54, adjacent a rearward end 36 of the harvester head 54, and a right gauge shoe 100 disposed on the right side of the harvester head 54, adjacent the rearward end 36 of the harvester head 54.

The harvester implement 20 may further include a shoe position sensor 102. The shoe position sensor 102 is operable to detect data related to a position of the gauge shoe 100 of the harvester head 54 relative to the linkage system 52. The shoe position sensor 102 may include, but is not limited to, a linear potentiometer, a rotary potentiometer, an optical sensor, and angular sensor, or some other device capable of detecting data related to the position of the gauge shoe 100 relative to the harvester head 54 and/or the linkage system 52. In other implementations, the operator of the vehicle may manually enter the position of the gauge shoe 100 via input 112 into a float control algorithm 118 described in greater detail below.

Referring to FIG. 5, the harvester implement 20 may further include a contact force sensor 104. The contact force sensor 104 is operable to detect a current contact force between the harvester head 54 and the ground surface 26. The contact force sensor 104 may include, but is not limited to, a load cell, an elastic pressure sensor, an electrical transducer, a differential pressure cell, a vacuum pressure sensor, a strain gauge, or some other device capable of detecting data related to the pressure and/or force exerted between the gauge shoe 100 of the harvester head 54 and the ground surface 26. In one implementation, the contact force sensor 104 may include a load cell that is coupled to the gauge shoe 100 of the harvester head 54. The load cell is operable to detect the load applied to the gauge shoe 100 by the ground surface 26.

Referring to FIG. 1, the contact force sensor 104 is operable to communicate a communication signal to a communicator 106. The communicator 106 may include a device capable of communicating a message to an operator. For example, the communicator 106 may include, but is not limited to, a touch screen display, a visual display, a speaker, one or more indicator lights, etc. The communication signal is operable to generate an indication of the current contact force between the harvester head 54 and the ground surface 26 on the communicator 106. In one implementation, the contact force sensor 104 sends a data signal to a controller 108, whereby the controller 108 then sends the communication signal to the communicator 106.

Referring to FIG. 1, the harvester implement 20 may further include an operator station 110, which houses control components of the harvester implement 20. The control components may include, but are not limited to, an output, e.g., the communicator 106, and an input 112. The communicator 106 is operable to convey a message to an operator. The input 112 is operable to receive instructions from the operator. In the example implementation described herein, the input 112 and the output are combined and implemented as a touch screen display. Messages may be communicated to the operator through the display, and data may be entered by the operator by touching the display as is understood by those skilled in the art. It should be appreciated that the input 112 and the output may differ from the example implementation described herein and may be separate or combined components. For example, the communicator 106 may include, but is not limited to, a video only display, an audio speaker, a light board, etc. The input 112 may include, but is not limited to, a mouse, a keyboard, a microphone, etc.

The controller 108 may be disposed in communication the various components of the harvester implement 20 described herein. The controller 108 is operable to at least receive data entry from the input 112, receive data from sensors, e.g., the tilt position sensor 92, the shoe position sensor 102, the temperature sensor 48, and/or the contact force sensor 104, send messages to the communicator 106, and control the operation of the left float cylinder 72 and the right float cylinder 76. While the controller 108 is generally described herein as a singular device, it should be appreciated that the controller 108 may include multiple devices linked together to share and/or communicate information therebetween. Furthermore, it should be appreciated that all or parts of the controller 108 may be located on the harvester implement 20 or located remotely from the harvester implement 20.

The controller 108 may alternatively be referred to as a head controller, a computing device, a computer, a control unit, a control module, a module, etc. The controller 108 includes a processor 114, a memory 116, and all software, hardware, algorithms, connections, sensors, etc., necessary to manage and control the operation of the components of the harvester implement 20 as described herein. As such, a method may be embodied as a program or algorithm operable on the controller 108. It should be appreciated that the controller 108 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 116 or received via the communication capabilities) to control or communicate with one or more other components. In certain embodiments, the controller 108 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 108 may be in communication with other components on the harvester implement 20, such as hydraulic components, electrical components, and operator inputs within the operator station 110. The controller 108 may be electrically connected to these other components by a wiring harness such that messages, commands, and electrical power may be transmitted between the controller 108 and the other components. Although the controller 108 is referenced in the singular, in alternative embodiments the configuration and functionality described herein can be split across multiple devices using techniques known to a person of ordinary skill in the art.

The controller 108 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 116 may include any non-transitory/tangible medium which participates in providing data or computer-readable instructions. The memory 116 may be non-volatile or volatile. Non-volatile media may include, for example, optical or magnetic disks and other persistent memory. Example volatile media may include dynamic random access memory (DRAM), which may constitute a main memory. Other examples of embodiments for memory 116 include a floppy, flexible disk, or hard disk, magnetic tape or other magnetic medium, a CD-ROM, DVD, and/or any other optical medium, as well as other possible memory devices such as flash memory.

The controller 108 includes the tangible, non-transitory memory 116 on which are recorded computer-executable instructions, including a float control algorithm 118. The processor 114 of the controller 108 is configured for executing the float control algorithm 118. The float control algorithm 118 implements a method of controlling the harvester implement 20, described in detail below.

The method of controlling the harvester implement 20 includes the controller 108 receiving a user defined input. The user defined input commands a desired ground contact force between the harvester head 54 and the ground surface 26 while operating in the float operating condition. The user defined input may be entered via an operator via the input 112, such as but not limited to a touch screen display. For example, the user may enter a desired ground contact force within a range bounded by an allowed minimum ground contact force and an allowed maximum ground contact force, for example, a value between one hundred fifty pounds (150 lbs.) and two hundred fifty pounds (250 lbs.). In the example implementation described herein, the desired ground contact force is the desired force to be transferred between the harvester head 54 and the ground surface 26 through each respective one of the left float cylinder 72 and the right float cylinder 76. In other words, the desired ground contact force is defined for both the left float cylinder 72 and the right float cylinder 76 separately. In other implementations, the desired ground contact force may be a cumulative force for the float cylinders.

Once the desired ground contact force has been received by the controller 108, the controller 108 may then automatically define an initial value of the internal fluid pressure to achieve the desired ground contact force. As described above, the internal fluid pressure of the float system 50, i.e., the internal fluid pressure of the left float cylinder 72 combined with the left accumulator 78, and the right float cylinder 76 combined with the right accumulator 82, control the ground contact force between the harvester head 54 and the ground surface 26. As such, the controller 108 may define, calculate, or estimate the value of the internal fluid pressure of the float system 50 required to achieve the desired ground contact force. This defined value of the internal fluid pressure may be defined as the initial internal fluid pressure of the float system 50. Once the controller 108 has defined the initial internal fluid pressure of the float system 50, the controller 108 may control the hydraulic system 42 to achieve the initial value of the internal fluid pressure in the float system 50, after which, operation of the harvester implement 20 may begin.

During operation of the harvester implement 20, the controller 108 may monitor one or more operating parameters of the harvester head 54 in order to automatically detect a change in the operating parameter of the harvester head 54 during operation. A change in the operating parameter may result in a change in the reaction of the float system 50 to the internal fluid pressure of the float system 50. In other words, while the internal fluid pressure of the float system 50 may remain constant, a change in the operating parameter may cause the ground contact force to change or vary from the desired ground contact force.

The one or more operating parameter of the harvester head 54 may include, but is not limited to, one of the tilt position of the harvester head 54 relative to the linkage system 52, the position of the gauge shoe 100 of the harvester head 54 relative to the linkage system 52, or the temperature of the hydraulic fluid generating the internal fluid pressure of the float system 50. As such, the controller 108 may automatically detect a change during operation in one of the tilt position of the harvester head 54 relative to the linkage system 52, the position of the gauge shoe 100 of the harvester head 54 relative to the linkage system 52, or the temperature of the hydraulic fluid generating the internal fluid pressure of the float system 50.

The controller 108 may use data received from the tilt position sensor 92 to detect a change in the tile position and/or tilt angle during operation. The controller 108 may use data received from the shoe position sensor 102 to detect a change in the position of the gauge shoe 100 during operation. In other implementations, the controller 108 may receive a position input from the operator via the input 112 defining the position of the gauge shoe 100 to detect or identify a change in the position of the gauge shoe 100. The controller 108 may use data received from the temperature sensor 48 to detect a change in the temperature of the hydraulic fluid during operation. It should be appreciated that a change in the operating parameter, e.g., a change in the tilt position, the position of the gauge shoe 100, or a change in the temperature of the hydraulic fluid, may change or alter the response of the float system 50 to the internal fluid pressure, thereby changing the resultant ground contact force between the harvester head 54 and the ground surface 26.

The change in the operating parameter of the harvester head 54 may be identified or detected by the controller 108 to include a deviation between a first data set and a second data set over a period of time that is greater than or less than a defined allowable threshold variation from an initial value of the operating parameter. In other words, the operating parameter may include the initial value of the operating parameter for which the harvester head 54 should operate. A change may be defined when an actual value of the operating parameter, detected by one or more sensors of the harvester implement 20, increases or decreases above or below the initial value of the operating parameter by the defined allowable threshold variation respectively. As such, the defined allowable threshold variation defines a range above and below the initial value of the operating parameter. Actual values outside of this range may be defined as a change in the operating parameter.

Upon detecting and/or identifying a change in the operating parameter, the controller 108 may then automatically adjust the internal fluid pressure of the float system 50. The controller 108 may adjust the internal fluid pressure of the float system 50 by re-defining the initial value of the internal fluid pressure to provide or define an adjusted value of the internal fluid pressure. The controller 108 adjusts the internal fluid pressure of the float system 50 to a value suitable to maintain the desired ground contact force during operation based on the detected change in the operating parameter of the cutter head during operation. Once the controller 108 has defined the adjusted value of the internal fluid pressure of the float system 50, the controller 108 may then control the hydraulic system 42 to achieve the adjusted value of the internal fluid pressure in the float system 50.

By continuously executing the process described herein, the controller 108 may dynamically change the internal fluid pressure of the float system 50 based on the changes in the operating parameter of the harvester head 54 during operation. By dynamically changing the internal fluid pressure of the float system 50 in response to the detected changes in the operating parameter, the controller 108 may maintain the desired ground contact force as desired, thereby improving operation of the harvester head 54.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A harvester implement comprising:

a main frame supporting at least one ground engaging device and operable to traverse across a ground surface;

a linkage system attached to the main frame and moveable relative to the main frame;

a harvester head attached to and supported by the linkage system relative to the main frame;

a float system interconnecting the main frame and the linkage system, wherein the float system includes an internal fluid pressure that is controllable to achieve a ground contact force between the harvester head and the ground surface;

a controller including a processor and a memory having a float control algorithm stored thereon, wherein the processor is operable to execute the float control algorithm to:

receive a user defined input commanding a desired ground contact force;

define an initial value of the internal fluid pressure to achieve the desired ground contact force;

automatically detect a change in an operating parameter of the harvester head during operation, wherein the operating parameter of the harvester head includes one of a tilt position of the harvester head relative to the linkage system, or a temperature of a hydraulic fluid generating the internal fluid pressure of the float system; and automatically re-define the initial value of the internal fluid pressure to provide an adjusted value of the internal fluid pressure to maintain the desired ground contact force based on the detected change in the operating parameter of the harvester head during operation.

2. The harvester implement set forth in claim 1, wherein the processor is operable to execute the float control algorithm to automatically detect a change during operation in one of the tilt position of the harvester head relative to the linkage system, or the temperature of the hydraulic fluid generating the internal fluid pressure of the float system.

3. The harvester implement set forth in claim 1, wherein the float system includes a hydraulic float cylinder operably controlled via the internal fluid pressure exerted by the hydraulic fluid.

4. The harvester implement set forth in claim 3, wherein the float system includes an accumulator disposed in fluid communication with the hydraulic float cylinder.

5. The harvester implement set forth in claim 1, further comprising a tilt system interconnecting the linkage system and the harvester head, wherein the tilt system includes a tilt cylinder operable to control a tilt angle between the harvester head and the linkage system.

6. The harvester implement set forth in claim 1, further comprising a tilt position sensor operable to detect a tilt angle between the harvester head and the linkage system.

7. The harvester implement set forth in claim 1, further comprising a temperature sensor operable to detect a temperature of the hydraulic fluid of the float system.

8. The harvester implement set forth in claim 1, wherein the change in the operating parameter of the harvester head includes a deviation between a first data set and a second data set over a period of time that is greater than or less than a defined allowable threshold variation from an initial value of the operating parameter.

9. A windrower implement comprising:

a float system including an internal fluid pressure that is controllable to achieve a ground contact force between a cutter head and a ground surface;

a controller including a processor and a memory having a float control algorithm stored thereon, wherein the processor is operable to execute the float control algorithm to:

automatically detect a change in an operating parameter of the cutter head during operation, wherein the operating parameter of the cutter head includes one of a tilt position of the cutter head, or a temperature of a hydraulic fluid generating the internal fluid pressure of the float system; and automatically adjust the internal fluid pressure of the float system to maintain the desired ground contact force based on the detected change in the operating parameter of the cutter head during operation.

10. The windrower implement set forth in claim 9, wherein the processor is operable to execute the float control algorithm to receive a user defined input commanding a desired ground contact force, and define an initial value of the internal fluid pressure to achieve the desired ground contact force.

11. The windrower implement set forth in claim 9, wherein the processor is operable to execute the float control algorithm to automatically detect a change during operation in one of the tilt position of the cutter head, or the temperature of the hydraulic fluid generating the internal fluid pressure of the float system.

12. The windrower implement set forth in claim 9, wherein the change in the operating parameter of the cutter head includes a deviation between a first data set and a second data set over a period of time that is greater than or less than a defined allowable threshold variation from an initial value of the operating parameter.

13. The windrower implement set forth in claim 9, further comprising a tilt system having a tilt cylinder operable to control a tilt angle of the cutter head.

14. The windrower implement set forth in claim 13, further comprising a tilt position sensor operable to detect a tilt angle between of the cutter head.

15. The windrower implement set forth in claim 9, further comprising a temperature sensor operable to detect a temperature of the hydraulic fluid of the float system.

* * * * *